3,167,524
PLASTICIZED HALOGEN-CONTAINING RESINS
Albert J. Lauck, Webster Groves, and Norman W. Touchette, Crestwood, Mo., assignors to Monsanto Company, a corporation of Delaware
No Drawing. Filed Dec. 22, 1961, Ser. No. 161,443
19 Claims. (Cl. 260—31.6)

This invention relates to new and useful compositions comprising halogen-containing vinyl resins and relates more particularly to compositions comprising halogen-containing vinyl resins plasticized with modified low molecular weight terminated polyester plasticizers.

Normally, vinyl halide polymers such as polyvinyl chloride and copolymers thereof, which are widely employed in the plastics industry, are quite hard and brittle in nature and require the addition of substantial proportions of a plasticizer to improve their workability. It is desirable to use a plasticizer which does not permit the product to become hard and brittle and thus easily fractured. It is especially desirable to use a plasticizer which will impart essentially permanent semi-rigid properties to the polymer composition, thereby eliminating the probability of the plasticizer being extracted and leaving the product brittle again. Plasticizers must meet certain requirements, most of all the requirements of being compatible with the resin. Moreover, the plasticizer must remain firmly bound with the plastic product to prevent exudation under conditions of use.

Polyester plasticizers of low molecular weight are known and in commercial use. Although these plasticizers perform reasonably well in many respects, resin compositions plasticized with these low molecular weight polyesters do not exhibit satisfactory humidity-compatibility characteristics.

It is an object of this invention to provide improved halogen-containing vinyl resin compositions.

A further object is to provide novel plastic compositions comprising halogen-containing vinyl resins and low molecular weight terminated polyesters.

A still further object of this invention is to provide new resin compositions which have good humidity-compatibility characteristics.

Other objects and advantages of this invention will become evident from the following description and claims.

In accordance with this invention it has been found that halogen-containing vinyl resins plasticized with a low molecular weight, terminated polyester of the type hereinafter described exhibit substantially improved humidity-compatibility characteristics and essentially permanent semi-rigid properties. The aforementioned compositions are prepared in a well known manner. The plasticized halogen-containing resin, upon fluxing and molding, results in a semi-rigid material.

Generally speaking, about 10 to about 400 parts by weight of the plasticizer can be used for each 100 parts by weight of resin. However, it is particularly preferred to use from about 20 to about 100 parts by weight of plasticizer per 100 parts by weight of resin.

This invention is particularly applicable to polymerized vinyl chloride resins and to resins formed by the conjoint polymerization of vinyl chloride with other materials such as vinyl acetate, vinyl propionate, vinylidene chloride, methyl methacrylate or diethyl maleate, preferably wherein vinyl chloride comprises at least 70% of the copolymer resin.

For many purposes it may be desirable to blend other conventional additives with the plasticized vinyl halide polymer compositions of the present invention. Illustrative of such additives are fillers, dyes, pigments, heat and light stabilizers, lubricants, and the like, and it will be apparent that compositions containing such other additives within the scope of this invention.

The plasticizers of this invention are low molecular weight, saturated, terminated, linear polyesters. Such polyesters comprise the residues of a (dihydroxy-dicyclohexyl)-alkane, a dihydroxy aliphatic compound of from 2 to 6 carbon atoms, a saturated, aliphatic dicarboxylic acid of from 4 to 10 carbon atoms, said polyester being terminated with a residue selected from the residues of mono-carboxylic saturated and unsaturated acids of from 2 to 20 carbon atoms, benzoic acid, naphthoic acid, saturated aliphatic alcohols of from 4 to 20 carbon atoms and phenylalkyl and phenoxyalkyl alcohols of from 7 to 10 carbon atoms. The ratio of (dihydroxy-dicyclohexyl)-alkane residue to dihydroxy aliphatic residue can vary from 1:10 to 1:4. The average molecular weight of such polyester is less than 4000.

As employed in the application, the phrase "residue of a (dihydroxy-dicyclohexyl)-alkane" designates the divalent radical

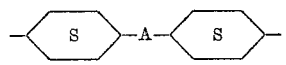

which results from the removal of the hydroxyl hydrogen atom from each of the cyclohexyl groups. The phrase "residue of a dihydroxy aliphatic compound" designates the divalent radical —O—A—O— which results from the removal of both of the hydroxyl hydrogen atoms. The phrase of "residue of a dicarboxylic acid" designates the divalent radical

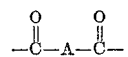

which results from the removal of the hydroxyl group from each of the carbonyl carbon atoms. In each of these radicals A represents a divalent, aliphatic linking radical. As employed in this application the phrase "residue of a monocarboxylic acid" designates the monovalent radical

which results from the removal of the hydroxyl group from the carbonyl carbon atom. As employed in this application, the phrase "residue of an alcohol" designates the monovalent radical T'— which results from the removal of the hydroxyl group.

The (4,4'-dihydroxy-dicyclohexyl)-alkanes which are suitable for use in preparing the polyester plasticizers of this invention are diols obtained by hydrogenation of the nucleus of the corresponding bis-phenols. The diols preferred according to this invention are those which are derived from bis-phenols obtained by condensation of monohydric phenols with aldehydes or ketones and are therefore technically readily accessible. As examples of (4,4'-dihydroxy-dicyclohexyl)-alkanes that may be mentioned in particular:

(4,4'-dihydroxy-dicyclohexyl)-methane,
1,1-(4,4'-dihydroxy-dicyclohexyl)-ethane,
1,1-(4,4'-dihydroxy-dicyclohexyl)-propane,
1,1-(4,4'-dihydroxy-dicyclohexyl)-butane,
1,1-(4,4'-dihydroxy-dicyclohexyl)-2-methyl-propane,
1,1-(4,4'-dihydroxy-dicyclohexyl)-heptane,
(4,4'-dihydroxy-dicyclohexyl)-cyclohexyl-methane,
(4,4' - dihydroxy - dicyclohexyl)-(4-methyl-cyclohexyl)-methane,
(4,4' - dihydroxy - dicyclohexyl)-(4-ethyl-cyclohexyl)-methane,
(4,4' - dihydroxy - dicyclohexyl)-(4-isopropyl-cyclohexyl) methane,
(4,4' - dihydroxy - dicyclohexyl)-(4-butyl-cyclohexyl) methane, 1,1-(4,4'-dihydroxy-dicyclohexyl)-2-cyclohexyl-ethane,
2,2-(4,4'-dihydroxy-dicyclohexyl)-propane,
2,2-(4,4'-dihydroxy-dicyclohexyl)-butane,
2,2-(4,4'-dihydroxy-dicyclohexyl)-pentane,
2,2-(4,4'-dihydroxy-dicyclohexyl)-4-methyl-pentane,
2,2-(4,4'-dihydroxy-dicyclohexyl)-heptane,
2,2-(4,4'-dihydroxy-dicyclohexyl)-octane,
2,2-(4,4'-dihydroxy-dicyclohexyl)-nonane,
1,1-(4,4'-dihydroxy-dicyclohexyl)-1-cyclohexyl-ethane,
3,3-(4,4'-dihydroxy-dicyclohexyl)-pentane,
4,4-(4,4'-dihydroxy-dicyclohexyl)-heptane,
1,1-(4,4'-dihydroxy-dicyclohexyl)-cyclopentane,
1,1-(4,4'-dihydroxy-dicyclohexyl)-cyclohexane,
2,2 - (4,4'-dihydroxy-3,3'-dicyclohexyl-dicyclohexyl)-propane,
3,3-(4,4'-dihydroxy-3-methyl-dicyclohexyl)-propane,
2,2-(4,4'-dihydroxy-3-isopropyl-dicyclohexyl)-butane,
1,1-(4,4'-dihydroxy-3,3'-dimethyl-dicyclohexyl)-cyclohexane,
2,2-(4,4'-dihydroxy-3,3'-dibutyl-dicyclohexyl)-propane,
2,2 - (4,4'-dihydroxy-3,3'-dicyclohexyl-cyclohexyl)-propane,
2,2-(4,4'-dihydroxy-2,2'-dimethyl-dicyclohexyl)-propane,
1,1 - (4,4' - dihydroxy-3,3'-dimethyl-6,6'-dibutyl-dicyclohexyl)-butane,
1,1 - (4,4' - dihydroxy-3,3'-dimethyl-6,6'-di-tert.-butyldicyclohexyl)-ethane,
1,1 - (4,4'-dihydroxy-3,3'-dimethyl-6,6'-di-tert.-butyl-dicyclohexyl)-propane,
1,1 - (4,4' - dihydroxy-3,3'-dimethyl-6,6'-di-tert.-butyl-dicyclohexyl)-butane,
1,1 - (4,4'-dihydroxy-3,3'-dimethyl-6,6'-di-tert.-butyl-dicyclohexyl)-isobutane,
1,1 - (4,4'-dihydroxy-3,3'-dimethyl-6,6'-di-tert.-butyl-dicyclohexyl)-heptane,
1,1 - (4,4'-dihydroxy-3,3'-dimethyl-6,6'-di-tert.-butyl-dicyclohexyl)-1-cyclohexyl-methane and
1,1 - (4,4' - dihydroxy-3,3'-dimethyl-6,6'-di-tert.-amyl-dicyclohexyl)-butane.

Illustrative of the dihydroxy aliphatic compounds which are suitable for use in preparing the low molecular weight polyester plasticizers of this invention are alkylene glycols such as ethylene glycol, 1,2-propanediol, 1,3-propanediol, 2-methyl-2-ethyl-1,3-propanediol, 1,2-butanediol, 1,3-butanediol, 1,4-butanediol, 2-butene-1,4-diol, 2,3-butanediol, 2,2-dimethyl propane-1,3-diol, 1,4-pentanediol, 1,5-pentanediol, 1,6-hexanediol, 2,2-diethyl-1,3-propanediol and the like, and the polyalkylene glycols such as diethylene glycol, triethylene glycol and dipropylene glycol.

The saturated aliphatic dicarboxylic acids suitable for use in preparing the polyester plasticizers of this invention include glutaric acid, adipic acid, pimelic acid, suberic acid, succinic acid, azelaic acid, sebacic acid and the like.

Illustrative examples of monocarboxylic acids or anhydrides, which may be saturated or unsaturated, suitable for use as terminators in preparing the low molecular terminated polyester plasticizers of this invention there may be mentioned acetic, acetic anhydride, propionic, butyric, valeric, caproic, enanthic, caprylic, pelargonic, capric, hendecanoic, oleic, ricinoleic, lauric, erucic, myristic, palmitic, margaric, stearolic, stearic, benzoic, toluic, naphthoic and the like.

The alcohols which are suitable as terminators for the polyester plasticizers of this invention include saturated aliphatics such as n-butyl alcohol, isoamyl alcohol, neopentyl alcohol, n-hexyl alcohol, n-octyl alcohol, n-nonyl alcohol, lauryl alcohol, myristal alcohol, cetyl alcohol, n-eicosyl alcohol and the like; the phenyl alkyl alcohols such as benzyl alcohol, phenylethyl alcohol, phenylbutyl alcohol and the like; and the phenoxyalkyl alcohols such as phenoxymethyl alcohol, phenoxybutyl alcohol and the like.

The exemplary alcohols, listed above, may be obtained from natural or synthetic sources. Thus, for example, the alcohols can be produced by the Oxo synthesis or can be derived from the Fischer-Tropsch process, the Synol process or the Oxyl process. Such alcohols can also be produced by the hydration of olefins or the oxidation of petroleum fractions or by the catalytic hydrogenation of coconut oil.

The low molecular weight, terminated, saturated, linear polyester plasticizers of this invention can be further characterized by the following general formula

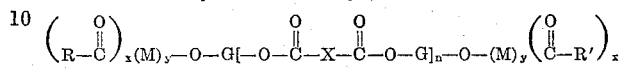

where $n$, the theoretical number of recurring units, has an average value of from 2 to 20, X represents a saturated aliphatic hydrocarbon containing from 2 to 10 carbon atoms, each G is selected from the group consisting of alkylene and oxyalkylene of from 2 to 6 carbon atoms and a saturated aliphatic dicyclohexyl hydrocarbon of from 13 to 29 carbon atoms, the ratio of saturated aliphatic dicyclohexyl hydrocarbon to alkylene and oxyalkylene being from 1:10 to 1:4, R and R' are each selected from the group consisting of alkyl and alkenyl of from 5 to 19 carbon atoms, phenyl and naphthyl, M is selected from alkyl of 4 to 20 carbon atoms and phenylalkyl and phenoxyalkyl of from 7 to 10 carbon atoms and $x$ and $y$ are unlike integers selected from 0 and 1. As employed herein, the term "oxyalkylene" designates the divalent ether group which forms the central portion of a polyalkylene glycol such as —$CH_2$—O—$CH_2$— in diethylene glycol. As employed herein, the term saturated aliphatic dicyclohexyl hydrocarbon represents hydrocarbon residue of a dihydroxy dicyclohexyl alkane.

Within the general formula given above, a particularly preferred group of polyesters are those wherein $n$ has an average value of from 10 to 18, each X is —$(CH_2)_z$— wherein $z$ is an integer of 4 to 9, G is selected from the group consisting of alkylene of from 2 to 6 carbon atoms and the hydrocarbon residue of a dihydroxy-dicyclohexyl-alkane of from 13 to 29 carbon atoms, and R and R' are alkyl of from 7 to 17 carbon atoms. Such preferred polyesters display the most desirable properties and are most readily prepared in view of the availability of starting materials.

Thus it can be seen that the plasticizers of this invention are linear, low molecular weight polyesters having a chain wherein a mixture of aliphatic glycol and dihydroxy-dicyclohexyl alkane residues are spaced by saturated dicarboxylic acid residues. It can also be seen that the monocarboxylic acid residues which terminate the polyester chain can be residues of a single acid or residues of a mixture of acids.

The polyesters of this invention are prepared by charging a reaction vessel with a mixture of glycols (within the ratios set forth above), a saturated dicarboxylic acid, a terminating acid or alcohol, and a transesterification catalyst. The mixture is heated to complete esterification and causes removal of water. The mixture is then further heated under vacuum to remove any excess glycol. The following detailed description will more fully illustrate the preparation of the low molecular weight, terminated, saturated polyesters of this invention.

EXAMPLE I

In a 1 liter three necked flask equipped with a stirrer, a thermometer and a three inch punched column with a condenser set downward for complete take-over was charged 360 g. (4.00 moles) of 1,3-butanediol, 292.2 g. (2.00 moles) adipic acid, 61.3 g. (0.255 mole) 2,2-(4,4'-dihydroxy-dicyclohexyl)-propane, 81.0 g. (0.30 mole) double pressed stearic acid and six drops of titanium tetrachloride. The mixture was heated at atmospheric pressure. At 145–160° C. water began to distill from the reaction mass. The reaction temperature was increased to 190–200° C. over a two hour period. The pressure of the system was slowly reduced to 400 mm. over a halfhour period. The batch temperature was raised to 205–210° C. and the vacuum was slowly reduced to about 3–4 mm. The glycol distillate was collected in a receiver. The glycol was stripped at a final batch condition of 215° C./2 mm. and this condition was held for about one hour. The batch was cooled to 150° C. under vacuum and filtered through filter aid. The yield of liquid polyester was 578 g.

The halogen-containing resins of this invention are those derived from such vinyl compounds as vinyl chloride, vinylidene chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide such as vinyl chloride with such materials as vinylidene chloride; vinyl esters of carboxylic acids, e.g. vinyl acetate, vinyl propionate, vinyl butyrate, vinyl benzoate; esters of unsaturated acids, e.g. alkyl acrylates such as methyl acrylate, ethyl acrylate, propyl acrylate, butyl acrylate, allyl acrylate, and the corresponding esters of methacrylic acid; vinyl aromatic compounds, e.g. styrene, ortho-chlorostyrene, para-chlorostyrene, 2,5-dichlorostyrene, 2,4-dichlorostyrene, para-ethyl styrene, vinyl naphthalene, α-methyl styrene; dienes such as butadiene, chlorobutadiene, unsaturated amides such as acrylic acid amide, acrylic acid anilide; unsaturated nitriles such as acrylic acid nitrile; esters of α,β-unsaturated carboxylic acids, e.g. the methyl, ethyl, propyl, butyl, amyl, hexyl, heptyl, octyl, allyl, methallyl and phenyl esters of maleic, crotonic, itaconic, and fumaric acids and the like.

It should be recognized that the halogenated resins containing halogens other than chlorine, e.g. bromine, fluorine and iodine, are also operable in this invention. Said halogenated resins may contain a varying proportion of halogen depending upon the nature of the resin and its contemplated use. Those copolymers in which a predominant portion, i.e., more than 50% by weight of the copolymer is made from a halogen-containing vinyl compound such as vinyl chloride represents a preferred class of polymers to be treated according to this invention.

The polyester plasticizers of this invention can be used in combination with the known monomeric plasticizers commonly employed with such resins. Illustrative of these latter plasticizers are the aryl and alkyl phosphates, the alkyl phthalates, adipates, sebacates and azelates, and the epoxidized vegetable oils. Specifically there can be mentioned tri-(2-ethylhexyl) phosphate, tricresyl phosphate, di-(2-ethylhexyl) phosphate and the corresponding adipate, dioctyl sebacate and epoxidized soya bean oils.

The compositions are prepared by mechanically mixing a halogen-containing resin with various amounts of the low molecular weight, terminated, saturated polyesters defined by the general formula set forth above, with or without a supplementary plasticizer such as dioctyl phthalate. The resulting mixtures are fluxed and milled on a heated, laboratory, differential speed two-roll mill. The surface temperature of the rolls is generally maintained at 160° C. but higher temperature such as 170° C. can be employed.

The following examples will further illustrate the invention and enable others skilled in the art to understand the invention more completely. It is understood, however, that the examples are given only as an illustration of the broad concept of the invention without the intent of limiting the scope of the invention thereto.

Table I lists a number of polyesters prepared in accordance with the procedures detailed in Example I. The specific reactants, the average number of recurring units ($n$ in the formula above) and the ratios of reactants, where appropriate, are given.

*Table I*

| Polyester | Glycol I | Glycol II | Ratio of I : II | Dicarboxylic Acid | Terminating Acid(s) | Average Number of Recurring Units |
|---|---|---|---|---|---|---|
| A | Neopentyl Glycol | HBPA [1] | 9:2 | Azelaic | Myristic and Palmitic [2] | 12.5 |
| B | 1,3-Butanediol | HBPA [1] | 9:2 | do | do [2] | 12.5 |
| C | 1,2-Propanediol | HBPA [1] | 9:2 | do | do [2] | 12.5 |
| D | 1,3-Butanediol | HBPA [1] | 8:1 | Adipic | Double Pressed Stearic | 13.4 |
| E | 1,3-Butanediol | HBPA [1] | 8:1 | do | do | 12.5 |
| F | 1,2-Propanediol | HBPA [1] | 10:1 | do | do | 15 |
| G [3] | 1,3-Butanediol | | | Azelaic | Myristic | 13 |
| H [3] | Neopentyl | | | Adipic | do | 13 |
| I [3] | 1,2-Propanediol | | | do | Double Pressed Stearic | 15 |
| J [3] | 1,3-Butanediol | | | do | do | 13 |

[1] 2,2-(4,4'-dihydroxy-dicyclohexyl)-propane.
[2] Ratio of Myristic to Palmitic, 1:1.
[3] Control.

Resinous compositions were prepared from a halogen-containing vinyl resin and the polyesters in Table I. These compositions are set forth in Table II, all parts being parts by weight.

*Table II*

| Components | Composition No. (Parts by Weight) | | | | | | | | | |
|---|---|---|---|---|---|---|---|---|---|---|
| | 1 | 2 | 3 | 4 | 5 | 6 | 7 | 8 | 9 | 10 |
| Polyvinyl Chloride | 100 | 100 | 100 | 100 | 100 | 100 | 100 | 100 | 100 | 100 |
| Polyester A | 50 | | | | | | | | | |
| Polyester B | | 50 | | | | | | | | |
| Polyester C | | | 50 | | | | | | | |
| Polyester D | | | | 50 | | | | | | |
| Polyester E | | | | | 50 | | | | | |
| Polyester F | | | | | | 50 | | | | |
| Polyester G | | | | | | | 50 | | | |
| Polyester H | | | | | | | | 50 | | |
| Polyester I | | | | | | | | | 50 | |
| Polyester J | | | | | | | | | | 50 |
| Dibasic lead stearate | 0.5 | 0.5 | 0.5 | 0.5 | 0.5 | 0.5 | 0.5 | 0.5 | 0.5 | 0.5 |

The compositions set forth in Table II were fluxed on a heated differential two-roll mill. The finished products are characterized by the physical properties listed below.

The following test methods are used in determining the physical properties listed in Table III.

Volatility _____ A.S.T.M. D-1203-55
Kerosene extraction _____ A.S.T.M. D-1239-55
Caustic extraction _____ A.S.T.M. D-1239-55

*Hardness.*—A Shore Durometer Hardness Tester was employed and the A scale was used. The specimen was of 250 mils thickness and the spring loaded penetrator was held down for 10 seconds.

*Humidity-compatibility.*—This was determined on the basis of the amount of exudation which occurred after aging in a water vapor saturated atmosphere at 80° C. Values are recorded as the number of days to definite exudation.

*Table III*

| Composition No. | Volatility Six Days | Hardness | Kerosene Extraction | Caustic Extraction | Humidity Compatibility Days | Compatibility of Polyester with Resin |
|---|---|---|---|---|---|---|
| 1 | 1.6 | 94 | 0.32 | 0.13 | 45 | Compatible. |
| 2 | 1.7 | 91 | 0.66 | 0.19 | >46 | Do. |
| 3 | 1.5 | 91 | 0.40 | 0.17 | 46 | Do. |
| 4 | 0.95 | 93 | 0.62 | 0.28 | 24 | Do. |
| 5 | 1.5 | 91 | 0.75 | 0.34 | 24 | Do. |
| 6 | 1.8 | 93 | 0.5 | 0.2 | 15 | Do. |
| 7 | 2.4 | 89 | 1.8 | 0.4 | 27 | Do. |
| 8 | 2.4 | 91 | 0.2 | 0.1 | 21 | Do. |
| 9 | 1.6 | 91 | 0.9 | 0.2 | 2 | Do. |
| 10 | 1.8 | 88 | 1.3 | 0.94 | 9 | Do. |

Results similar to those obtained with compositions A through J of Table I are obtained when the following alcohols are used as terminators for the polyester plasticizers in place of the monocarboxylic acid: neopentyl alcohol, n-hexyl alcohol, n-octyl alcohol, isoamyl alcohol, myristal alcohol, lauryl alcohol, cetyl alcohol, benzyl alcohol, phenoxyethyl alcohol, phenylbutyl alcohol, and phenoxybutyl alcohol.

While this invention has been described with respect to certain embodiments, it is not so limited and it is to be understood that variations and modifications thereof may be made without departing from the spirit or scope of this invention.

The embodiments of the invention in which an exclusive property or privilege is claimed are defined as follows:

1. A composition comprising a vinyl halide polymer selected from the group consisting of polymerized vinyl halide monomers and the copolymers of such monomers with an ethylenically unsaturated monomer, at least 50% of the monomer units of said copolymers being vinyl halide units, and a terminated, saturated polyester consisting essentially of the residues of a dihydroxydicyclohexyl-alkane of from 13 to 29 carbon atoms, a dihydroxy aliphatic compound of from 2 to 6 carbon atoms, a saturated aliphatic dicarboxylic acid of from 4 to 10 carbon atoms, said polyester being terminated with a residue selected from the group consisting of the residues of monocarboxylic saturated and unsaturated aliphatic acids of from 6 to 20 carbon atoms, benzoic acid, naphthoic acid, saturated aliphatic alcohols of from 4 to 20 carbon atoms and phenyl alkyl and phenoxyalkyl alcohols of from 7 to 10 carbon atoms, the ratio of dihydroxy-dicyclohexyl alkane to dihydroxy aliphatic compound residues being from 1:10 to 1:4.

2. A composition as defined in claim 1 wherein the polyester is present in amounts of from about 10 to about 400 parts by weight per 100 parts by weight of vinyl halide polymer.

3. A composition comprising a vinyl halide polymer selected from the group consisting of polymerized vinyl halide monomer and the copolymer of such monomers with an ethylenically unsaturated monomer, at least 50% of the monomer units of said copolymers being vinyl halide units, and a terminated, saturated polyester of the formula

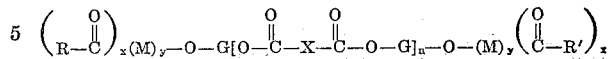

wherein:

$n$ is an integer from 2 to 20;

X is a saturated aliphatic hydrocarbon of from 4 to 10 carbon atoms;

each G is selected from the group consisting of saturated aliphatic dicyclohexyl hydrocarbons of from 13 to 29 carbon atoms and alkylene and oxyalkylene of from 2 to 6 carbon atoms, the ratio of saturated aliphatic dicyclohexyl hydrocarbon to alkylene and oxyalkylene represented by G being from 1:10 to 1:4;

R and R' are each selected from the group consisting of alkyl and alkenyl of from 5 to 19 carbon atoms, phenyl and naphthyl;

M is selected from alkyl of from 4 to 20 carbon atoms, and phenyl alkyl and phenoxyalkyl of from 7 to 10 carbon atoms; and $x$ and $y$ are unlike integers selected from 0 and 1.

4. A composition as defined in claim 3 wherein the polyester is present in amounts of from about 10 to about 400 parts by weight per 100 parts by weight of vinyl halide polymer.

5. A composition comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units, and a terminated, saturated polyester consisting essentially of the residues of a dihydroxy-dicyclohexyl-alkane of from 13 to 29 carbon atoms, a dihydroxy aliphatic compound of from 2 to 6 carbon atoms, a saturated aliphatic dicarboxylic acid of from 4 to 10 carbon atoms, said polyester being terminated with a residue selected from the group consisting of the residues of monocarboxylic saturated and unsaturated aliphatic acids of from 6 to 20 carbon atoms, benzoic acid, naphthoic acid, saturated aliphatic alcohols of from 4 to 20 carbon atoms and phenylalkyl and phenoxyalkyl alcohols of from 7 to 10 carbon atoms, and the ratio of dihydroxy-dicyclohexyl-alkane to dihydroxy aliphatic compound residues being from 1:10 to 1:4.

6. A composition as defined in claim 5 wherein the polyester is present in amounts of from about 10 to about 400 parts by weight per 100 parts by weight of vinyl chloride polymer.

7. A composition as defined in claim 5 wherein the vinyl chloride polymer is polyvinyl chloride.

8. A composition comprising a vinyl chloride polymer selected from the group consisting of polymerized vinyl chloride monomers and the copolymers of such monomers with an ethylenically unsaturated monomer, at least 50% of the monomer units of said polymers being vinyl chloride units, and a terminated, saturated polyester of the formula

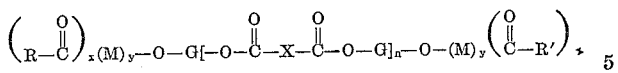

wherein:
$n$ is an integer from 2 to 20;
X is a saturated aliphatic hydrocarbon of from 4 to 10 carbon atoms;
each G is selected from the group consisting of saturated aliphatic dicyclohexyl hydrocarbons of from 13 to 29 carbon atoms and alkylene and oxyalkylene of from 2 to 6 carbon atoms, the ratio of saturated aliphatic dicyclohexyl hydrocarbon to alkylene and oxyalkylene represented by G being from 1:10 to 1:4;
R and R′ are each selected from the group consisting of alkyl and alkenyl of from 5 to 19 carbon atoms, phenyl and naphthyl;
M is selected from alkyl of from 4 to 20 carbon atoms, and phenylalkyl and phenoxyalkyl of from 7 to 10 carbon atoms; and
$x$ and $y$ are unlike integers selected from 0 and 1.

9. A composition of claim 8 wherein the polyester is present in amounts of from about 10 to about 400 parts by weight per 100 parts by weight of vinyl chloride polymer.

10. A composition of claim 8 wherein the vinyl chloride polymer is polyvinyl chloride.

11. A composition comprising a vinyl halide polymer selected from the group consisting of polymerized vinyl halide monomer and the copolymers of such monomers with an ethylenically unsaturated monomer, at least 50% of the monomer units of said copolymer being vinyl halide units, and a terminated, saturated polyester of the formula

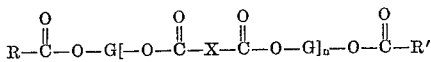

wherein:
$n$ is an integer from 10 to 18;
X is $-(CH_2)_z-$ wherein $z$ is an integer of 4 to 9;
each G is selected from the hydrocarbon residue of a dihydroxy-dicyclohexyl-alkane of from 13 to 29 carbon atoms and alkylene of from 2 to 6 carbon atoms, the ratio of the hydrocarbon residue of dihydroxy-dicyclohexyl-alkane to alkylene is from 1:10 to 1:4; and
R and R′ are alkyl of from 7 to 17 carbon atoms.

12. A composition of claim 11 wherein the polyester is present in amounts of from about 10 to about 400 parts by weight per 100 parts by weight of vinyl halide polymer.

13. A composition comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units, and a terminated, saturated polyester of the formula

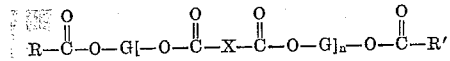

wherein:
$n$ is an integer from 10 to 18;
X is $-(CH_2)_z-$ wherein $z$ is an integer of 4 to 9;
each G is selected from the hydrocarbon residue of a dihydroxy-dicyclohexyl-alkane of from 13 to 29 carbon atoms and alkylene of from 2 to 6 carbon atoms, the ratio of the hydrocarbon residue of dihydroxy-dicyclohexyl-alkane to alkylene is from 1:10 to 1:4; and
R and R′ are alkyl of from 7 to 17 carbon atoms.

14. A composition of claim 13 wherein the polyester is present in amounts of from about 10 to about 400 parts by weight per 100 parts by weight of vinyl chloride polymer.

15. A composition of claim 13 wherein the polyester is present in amounts of from about 20 to about 100 parts by weight per 100 parts by weight of vinyl chloride polymer.

16. A composition of claim 13 wherein the vinyl chloride polymer is polyvinyl chloride.

17. A composition comprising polyvinyl chloride and a terminated, saturated polyester consisting essentially of the residues of 1,3-butanediol, 2,2′(4,4′-dihydroxy-dicyclohexyl)-propane and adipic acid, said polyester being terminated with the residue of a saturated, aliphatic monocarboxylic acid of from 7 to 17 carbon atoms, the ratio of the 2,2′-(4,4′-dihydroxy-dicyclohexyl)-propane residue to 1,3-butanediol residue being from 1:10 to 1:4, said polyester being present in amounts of from about 10 to about 400 parts by weight per 100 parts by weight of polyvinyl chloride.

18. A composition comprising polyvinyl chloride and a terminated, saturated polyester consisting essentially of the residues of 1,2-propanediol, 2,2′-(4,4′-dihydroxy-dicyclohexyl)-propane and adipic acid, said polyester being terminated with the residue of a saturated, aliphatic monocarboxylic acid of from 7 to 17 carbon atoms, the ratio of the 2,2′-(4,4′-dihydroxy-dicyclohexyl)-propane residue to 1,2-propanediol residue being from 1:10 to 1:4, said polyester being present in the amounts of from about 10 to about 400 parts by weight per 100 parts by weight of polyvinyl chloride.

19. A composition comprising polyvinyl chloride and a terminated, saturated polyester consisting essentially of the residues of 1,3-butanediol, 2,2′-(4,4′-dihydroxy-dicyclohexyl)-propane and azelaic acid, said polyester being terminated with the residue of a saturated, aliphatic monocarboxylic acid of from 7 to 17 carbon atoms, the ratio of the 2,2′-(4,4′-dihydroxy-dicyclohexyl)-propane residue to 1,3-butanediol residue being from 1:10 to 1:4, said polyester being present in amounts of from about 10 to about 400 parts by weight per 100 parts by weight of polyvinyl chloride.

References Cited in the file of this patent

UNITED STATES PATENTS

| | | |
|---|---|---|
| 2,723,286 | Young et al. | Nov. 8, 1955 |
| 2,744,877 | Smith | May 8, 1956 |